(No Model.)
A. TODD.
APPARATUS FOR BLEACHING FRUIT.
No. 384,880. Patented June 19, 1888.
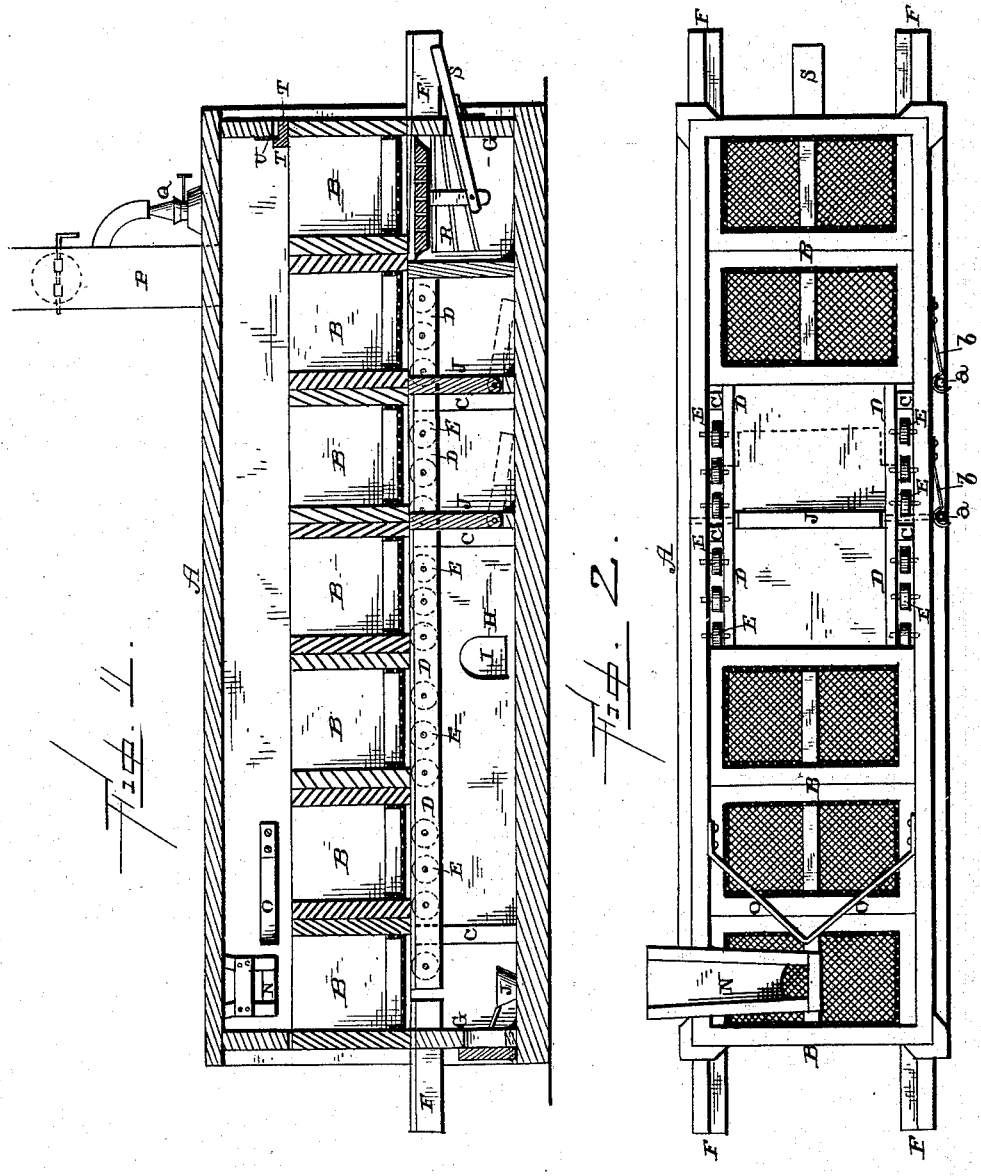
Witnesses.
L. F. Gardner.
Edm. P. Ellis.
Inventor.
A. Todd,
per
F. A. Lehmann,
Atty.

UNITED STATES PATENT OFFICE.

ASAHEL TODD, OF PULTNEYVILLE, NEW YORK.

APPARATUS FOR BLEACHING FRUIT.

SPECIFICATION forming part of Letters Patent No. 384,880, dated June 19, 1888.

Application filed February 21, 1888. Serial No. 264,788. (No model.)

*To all whom it may concern:*

Be it known that I, ASAHEL TODD, of Pultneyville, in the county of Wayne and State of New York, have invented certain new and useful Improvements in Apparatus for Bleaching Fruit; and I do hereby declare the following to be a full, clear, and exact description of the invention, such as will enable others skilled in the art to which it pertains to make and use it, reference being had to the accompanying drawings, which form part of this specification.

My invention relates to an improvement in apparatus for bleaching fruit, &c.; and it consists in, first, the combination, with the frame, which is open at each end, so that the trays can be pushed in at one end and forced out at the other, of side strips, which extend horizontally along the inner sides of the frame, and friction-rollers, which are journaled between the strips and the sides of the frame, and upon which the boxes filled with fruit freely slide; second, the combination of the frame, a trough through which the fruit is fed to the boxes, and a V-shaped cross-bar, which serves to level the fruit in the boxes as they are pushed along in the frame from under the trough; third, the combination of the frame with movable partitions, which are placed in the lower part thereof, and which can be raised or lowered, according to the amount of fruit which is to be bleached; fourth, the combination of the frame, the boxes containing the fruit, and a bellows located in one end, whereby the surplus sulphur-fumes can be driven off; fifth, the arrangement and combination of parts, which will be more fully described hereinafter.

The objects of my invention are to form a single chamber above the tops of the boxes; to provide movable partitions to arrest the fumes from passing beyond a certain point, according to the space required to bleach the fruit; to provide means whereby the surplus fumes of sulphur can be driven from the fruit; and to provide a bleaching apparatus, in which the fruit can be rapidly and easily bleached and at a very slight expense.

Figure 1 is a vertical section of an apparatus embodying my invention. Fig. 2 is a plan view of the same with the top removed.

A represents a rectangular frame, of any desired width and length, and which is provided with an opening at each end, so that the boxes B, to contain the fruit to be bleached, can be passed freely in at one end and out at the other. Secured to the inner side of the lower portion of each side of the frame are vertical rods or cleats C, and to the upper inner sides of these rods or cleats C are secured the horizontal strips D. Between the sides of the frame and the sides of the strips D are placed the friction rollers E, upon which the boxes B freely move. The upper edges of these friction-rollers E project slightly above the upper edges of the strip D, so that the lower edges of the boxes can rest solidly upon them. Extending out through each corner of the frame are the strips F, which serve as tracks upon which the boxes move at the ends of the frame, and these strips also serve as handles, by means of which the frame can be freely lifted and carried around. The frame is closed at each end by the end pieces, G, to a point on a level with the top edges of the strips, as shown, and through the sides are made suitable openings, H, which are closed by the pivoted dampers I, and through which openings H the vessel J containing the sulphur is passed. The pivoted dampers I are designed to regulate the passage of the sulphur-fumes through the fruit. Closing them gives slow circulation, so the fruit may absorb a greater quantity of it, and creates a circulation of air inward through the trough carrying the fumes above the boxes to the ventilating-pipe P.

In the bottom of the frame are placed a suitable number of partitions, J, which have their upper edges to extend on a level with the side strips, D, and which serve to contract or enlarge the space in which the bleaching is to be done according to the amount of fruit to be bleached. If only a part of the boxes are subjected to the action of the sulphur-fumes, one or both of the partitions J are raised into a vertical position, and thus the fumes of the sulphur are prevented from spreading through the entire frame before rising through the fruit. If the frame is filled with boxes of fruit and the whole is to be bleached at once, the partitions are opened, so that the fumes of the sulphur can pass along the bottom of the frame and then rise through the fruit above. The bleacher is provided with one extra box, so the frame is at all times full, thereby closing each end of the frame. As a succession of boxes are filled under the trough, each of the partitions J is provided with a handle, $a$, which extends outside of the boxes, and a suitable holding-spring, $b$, for holding the partition in a vertical position, and which thus prevents accidental displacement.

Extending through the sides of the boxes at one end is the trough N, through which the fruit is fed successively into the boxes B. The inner end of this trough projects inward just over the center of the end box, which is to be filled, and the fruit is forced in until the trough becomes clogged, when the operator knows the box has been filled. The box is then forced along upon the friction-rollers by the introduction of one empty box, and as it passes under the V-shaped leveling-strip O the fruit is leveled in the box. This strip O is made V-shaped, so as to move the fruit evenly toward each end of the box. Above the top of the box there is formed only a single chamber, which extends from one end of the frame to the other, so as to allow a full and free circulation of the fumes and a free ventilation when it is desired to drive off the surplus fumes. Rising from the top of the frame, preferably near one end, is the pipe or ventilator P, and connected with this pipe or ventilator is an oil stove or lamp, Q, as shown, so as to create an upward draft through the pipe and thus draw off the heavy fumes of the sulphur. When it is desired to drive off any surplus fumes of sulphur, the bellows R, which are located at one end of the frame, are operated by the lever S, which projects through the end of the frame. The top of the bellows is provided with perforations, so that the air escapes freely therefrom, and in moving through the frame toward the ventilator-pipe P carries off all of the surplus fumes. The air may be forced successively through each box as it is moved over the top of the bellows, or only in sufficient quantity to support combustion, which is regulated by the pivoted dampers I.

At that end of the frame where the boxes are removed, in order to form a tight joint and thus prevent the escape of the sulphur-fumes, there is secured the cross-bar T by means of the flexible material U, which allows the strip to freely rise and fall, and thus adapts itself to the height of the boxes. By catching against the sides of the boxes the fumes are confined to the chamber and prevented from escaping into the room.

Having thus described my invention, I claim—

1. The combination of the frame A, provided with a series of horizontal rollers, and the boxes B, having open bottoms, so that the sulphur-fumes will rise through the fruit contained therein, with the hinged partitions J, which are placed in the chamber underneath the boxes, and in which the sulphur-fumes are generated, substantially as described.

2. The combination of the frame A, provided with horizontal supports upon which the boxes containing the fruit are placed, and having a chamber or space above the boxes for a free circulation of air, and a chamber below the boxes in which the sulphur-fumes are generated, with the hinged partitions J, the bellows located at one end, and a ventilating-pipe P, substantially as set forth.

3. The combination, with the frame and the boxes which are to be filled with the fruit, of the trough through which the fruit is fed into the boxes, and the V-shaped leveling device placed in the frame just above the top of the boxes, substantially as described.

In testimony whereof I affix my signature in presence of two witnesses.

ASAHEL TODD.

Witnesses:
   HENRY H. GRIFFEN,
   RAYMOND TUFTS.